US009767216B2

(12) United States Patent
Hiscock et al.

(10) Patent No.: US 9,767,216 B2
(45) Date of Patent: Sep. 19, 2017

(54) METHOD AND SYSTEM FOR CAPTURING AND APPLYING CHANGES TO A DATA STRUCTURE

(75) Inventors: Mark James Hiscock, Hampshire (GB); Christopher Colin Paice, Hants (GB)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 12/204,571

(22) Filed: Sep. 4, 2008

(65) Prior Publication Data

US 2009/0070349 A1    Mar. 12, 2009

(30) Foreign Application Priority Data

Sep. 10, 2007    (EP) .................................... 07116023

(51) Int. Cl.
    *G06F 17/30*          (2006.01)

(52) U.S. Cl.
    CPC .. *G06F 17/30958* (2013.01); *G06F 17/30286* (2013.01)

(58) Field of Classification Search
    CPC .................. G06F 17/30958; G06F 17/30286
    USPC ............... 707/610, 625, 694–695, 789–790, 707/879–800, 999.101, 999.102, 999.21, 707/999.203, 953
    See application file for complete search history.

(56) References Cited

U.S. PATENT DOCUMENTS

| | | | |
|---|---|---|---|
| 5,115,504 A * | 5/1992 | Belove et al. ................ 707/758 |
| 5,806,078 A * | 9/1998 | Hug et al. ..................... 715/205 |
| 7,134,071 B2 * | 11/2006 | Ohwada et al. ............... 715/229 |
| 7,912,842 B1 * | 3/2011 | Bayliss ......................... 707/749 |
| 2001/0047352 A1 * | 11/2001 | Todd ................. G06F 17/30893 |
| 2002/0129023 A1 * | 9/2002 | Holloway et al. .............. 707/10 |
| 2002/0141449 A1 * | 10/2002 | Johnson .................. G06F 9/546 370/473 |
| 2003/0037102 A1 * | 2/2003 | Eckert ..................... H04L 29/06 709/203 |
| 2003/0069980 A1 * | 4/2003 | Picca .................... H04L 67/025 709/227 |
| 2004/0186843 A1 | 9/2004 | Blaszczak |
| 2005/0065963 A1 | 3/2005 | Ziemann et al. |
| 2005/0289175 A1 | 12/2005 | Krishnaprasad et al. |
| 2008/0033987 A1 * | 2/2008 | Carter ............... G06F 17/30958 |

\* cited by examiner

*Primary Examiner* — Robert Beausoliel, Jr.
*Assistant Examiner* — Susan F Rayyan
(74) *Attorney, Agent, or Firm* — Steven M. Greenberg, Esq.; CRGO Law (57) ABSTRACT

A method and system are provided for capturing and applying changes to a data structure made by one or more processing nodes. The method includes providing a data structure including one or more elements (200-205), maintaining a linked record of changes (200a-200c, 201a-201c, 205a-205b) to each element (200-205) made by a processing node. A new value of an element (200-205) is linked to the previous value. A record (250) of the sequence of changes to the elements (200-205) is also maintained. In one embodiment, the linked record of changes (200a-200c, 201a-201c, 205a-205b) is a push down stack. The data structure is defined including indirections (210-215) pointing to most recent values of an element (200-205), which in turn points to the previous value of the element (200-205), forming a linked record to the initial value of the element.

18 Claims, 11 Drawing Sheets

FIG. 8B

US 9,767,216 B2

METHOD AND SYSTEM FOR CAPTURING AND APPLYING CHANGES TO A DATA STRUCTURE

CROSS-REFERENCE TO RELATED APPLICATIONS

This application claims priority under 35 U.S.C. §119(a) to European Patent Application Serial Number 07116023.8 filed 10 Sep. 2007 the entirety of which is incorporated herein by reference.

This invention relates to the field of data structures. In particular, it relates to capturing changes to a data structure, and allowing changes to be identified by a programmer or inspected by an end user.

There is a problem of poor performance resulting from repeated copying of data structures. Applications such as an Enterprise Service Bus (ESB), message broker, WebSphere application server (WAS) (WebSphere is a trade mark of International Business Machines Corporation), etc. take data structures in the form of message trees and pass them to discrete nodes for processing. The problem also applies to other forms of data structures such as arrays which are processed by one or more entity.

In order to illustrate the problem, the field of message brokers is used. A message broker implements a sequence of processing nodes. Each processor node may process or transform a received message in some way. Within the message broker, an input message is parsed into a tree structure (such as extensible markup language (XML) elements in an XML document). The information represented by this tree structure is then passed between processing nodes within the broker and is possibly changed by each node.

A processing node can fan out to more than one processing node. There need be no predefined order in which these fanned out processing nodes are invoked. The data structure passed to each fanned out processing node must be the same, and changes made by one fanned out processing node must not be visible to another fanned out processing node at the same level. In current implementations, the output of a processing node is a copy of the input data structure including any modifications the processing node may have done. The copying is slow and expensive in CPU, and memory especially for complex data structures that include thousands of elements which is quite common in XML documents.

The copying is also undesirable as most processing nodes process a data structure that is substantially the same as that processed by the other processing nodes.

The present invention provides an improved capture of changes to a data structure in order to avoid copying of whole data structures between processing nodes.

The present invention provides the ability for processing nodes to see what changes have been made previously and by which previous processing node.

According to a first aspect of the present invention there is provided a method for capturing and applying changes to a data structure made by one or more processing nodes, comprising: providing a data structure including one or more elements; maintaining a linked record of changes to each element made by a processing node, wherein a new value of an element is linked to the previous value; and maintaining a record of the sequence of changes to the elements.

According to a second aspect of the present invention there is provided a system for capturing and applying changes to a data structure comprising: one or more processing nodes; a data structure including one or more elements; a linked record of changes to each element made by a processing node; and a record of the sequence of changes to the elements.

According to a third aspect of the present invention there is provided a computer program product stored on a computer readable storage medium, comprising computer readable program code means for capturing and applying changes to a data structure made by multiple processing nodes, including performing the steps of: providing a data structure including one or more elements; maintaining a linked record of changes to each element made by a processing node, wherein a new value of an element is linked to the previous value; and maintaining a record of the sequence of changes to the elements.

Embodiments of the present invention will now be described, by way of examples only, with reference to the accompanying drawings in which.

One or more processing node may process or transform elements in a data structure passed to it. For example, processing nodes may be subroutines handling the same data structure, or nodes in a messaging system, etc. A processing node can make changes to the data structure but it must undo the effects of the changes before returning to its caller. A processing node can modify elements in the data structure, and pass this modified data structure on to other processing nodes, which in turn can change the data structure, and these must, by the same principle, undo any changes that they make.

Typically, this is implemented by creating a copy of the data structure and passing this copy to the processing node. The processing node can make changes, and when the processing node has finished processing, this copy of the data structure is thrown away.

The described method and system specify a way of capturing changes to a data structure, such that the changes can easily be undone. Instead of creating a copy of the data structure, the same data structure is passed on, but with changes made to the data structure recorded against the data structure. When the processing node returns, the changes are undone.

The data structure may take the form of a tree data structure, an array, or other form of data structure having distinct elements within the data structure, located by address, which may be individually changed.

The described method and system use a linked record of changes to each of element within the data structure for capturing changes to a data structure. The linked record of changes may be a push down stack of values for each element of the data structure, or may be a linked list of values in reverse order. The linked record of changes to each element is maintained for the data structure during a flow through one or more processing nodes.

The order in which changes are made also needs to be stored so changes can be undone in the reverse order. A time ordered record is maintained to identify the order and locate the changes. This time ordered list could be a push down stack, array or linked list.

The time ordered list may be stored separately from the data structure. Alternatively, it may be incorporated into the data structure, for example, in the form of pointers between elements in the reverse order of their execution.

In one embodiment, a separate time ordered list is used for each processing node. In another embodiment, a single time ordered list is used for all processing nodes in a process.

The original copy of the data structure, plus relevant changes to the data structure that are represented within each element's linked record of changes, are referenced by processing nodes. This avoids the need to copy the whole data structure and provides an easy back out mechanism for the changes made to the data structure. Removing the need to copy the whole data structure improves processing performance.

Multiple tasks may update a singe data structure as long as the integrity of the data structure and the time ordered list are maintained. Using standard programming practice taking locks on elements before doing updates to the data structure. Before control is passed back to the processing node that called, the active processing node undoes all the changes it made since it got control by traversing the time ordered list in reverse order.

Figure 1:
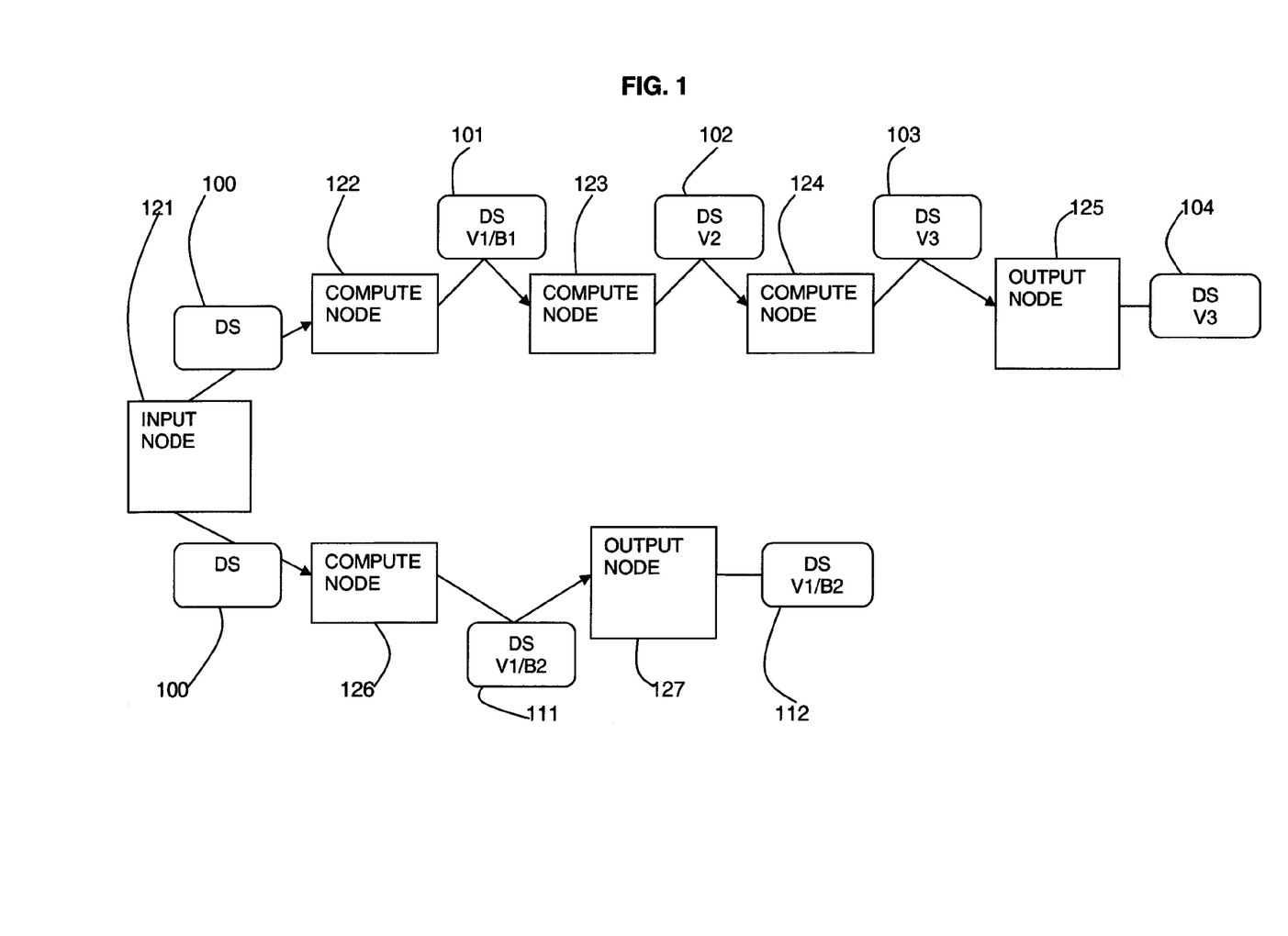
FIG. 1 is a block diagram of a system of processing nodes showing data being processed as known in the prior art and as addressed in the present invention.

A data structure may be processed by a plurality of processing nodes in many different environments. Referring to FIG. 1, a block diagram shows a generalised system of a plurality of processing nodes 121-127 which process a data structure, for example in the form of a tree data structure, or array. The processing nodes 121-127 may be a system of sub-routines.

A data structure 100 is processed, transformed or passed on by each processing node 121-127 such that version of the data structure 100-104, 111, 112 flow from one processing node 121, into the next 122. A processing node 121 can cause a version of the data structure to flow to more than one processing node 122, 126. The version of the data structure passing between processing nodes 121-127 can be different.

In the prior art, the different versions of the data structure 100-104, 111, 112 are provided by copying the data structure at each processing node 121-127. In the described method and system, the different versions of the data structure 100-104, 111, 112 are provided by a modified data structure with each element of the data structure including a linked record of changes made in reverse order, for example as push down stacks for each element.

FIG. 1 shows an example of a system of processing nodes 121-127. In FIG. 1, a data structure 100 is fanned out as it passed from an input node 121 to two compute nodes 122, 126 forming two branches of the process. Each of the two compute nodes 122, 126 processes the data structure 100 differently and outputs amended versions of the data structure 101, 111. So, the data structure 100 is passed into a first compute node 122 in a first branch of the process and the output is the first version of the data structure 101 in this branch (V1/B1, version 1/branch 1). The data structure 100 is also passed into the first compute node 126 of the second branch and the output is the first version of the data structure 111 in this second branch (V1/B2, version 1/branch 2).

In the first branch, the first version of the data structure, 101, from the first compute node 122 is passed to the second compute node, 123, which processes the first version of the data structure 101 and transforms it into a second version of the data structure 102. The second version of the data structure, 102, is output from the second compute node 123 and is passed to the third compute node 124 which processes the second version of the data structure, 102, and transforms it to a third version of a data structure 103. The third version of the data structure, 103, is output from the third compute node 124 and is passed to an output node 125 which outputs the third version of the data structure, 104.

In the second branch containing the compute node 126, the first version of the data structure 111 in this branch is output from the compute node 126 and is passed to an output node 127 which outputs the first version of the data structure 112.

An example embodiment is now described in the context of a message flow within a message broker. A message is received at the broker for processing before being output as an output message. For example, a message may be received by the broker from a network transport such as WebSphere MQ or via HTTP (hypertext transfer protocol), etc. The message is parsed by an input node of the message flow to determine the structure of the message, and a data structure in the form of a hierarchical representation of the message is built. For example, the hierarchical representation may be a root with child elements of properties and data, with the data element having child elements such as customer ID, amount, and price.

A first compute node performs some processing/transformation of the message. Some change may be made and then the modified message is passed onto a next compute node, and eventually to an output node. Within the message flow, there may be various computations performed, and each processing node is processing a slightly different input because of the processing performed by the other processing nodes.

The required ability to make changes, while maintaining the ability to back out, has conventionally been met by making a copy of the complex data structure by each processing node. This is costly both in terms of memory requirements and CPU processing cycles.

By using indirection by passing pointers to the data structure held in memory and using a system of push down stacks as described above, each processing node can access the same current values of the tree data structure so far. This reduces memory requirements, especially for message flows in which messages that include complex, verbose XML are only changed slightly by each compute node (for example, changing a customer name or price).

A back out of changes can also be performed since each processing node does not overwrite the original hierarchical representation of the message but instead saves a set of changes that can either be applied or backed out. There can be chains of pointers as each new compute node makes its own changes which are held in its push down stack and points to the data structure that was provided to the compute node.

The implementation of push down stacks is similar in all of the programming languages of PL/I, Assembler, and C;

whereas Java and C++ have objects which can provide the ability to be a stack and so the stack could be implemented as provided by the programming infrastructure.

Figure 2A:
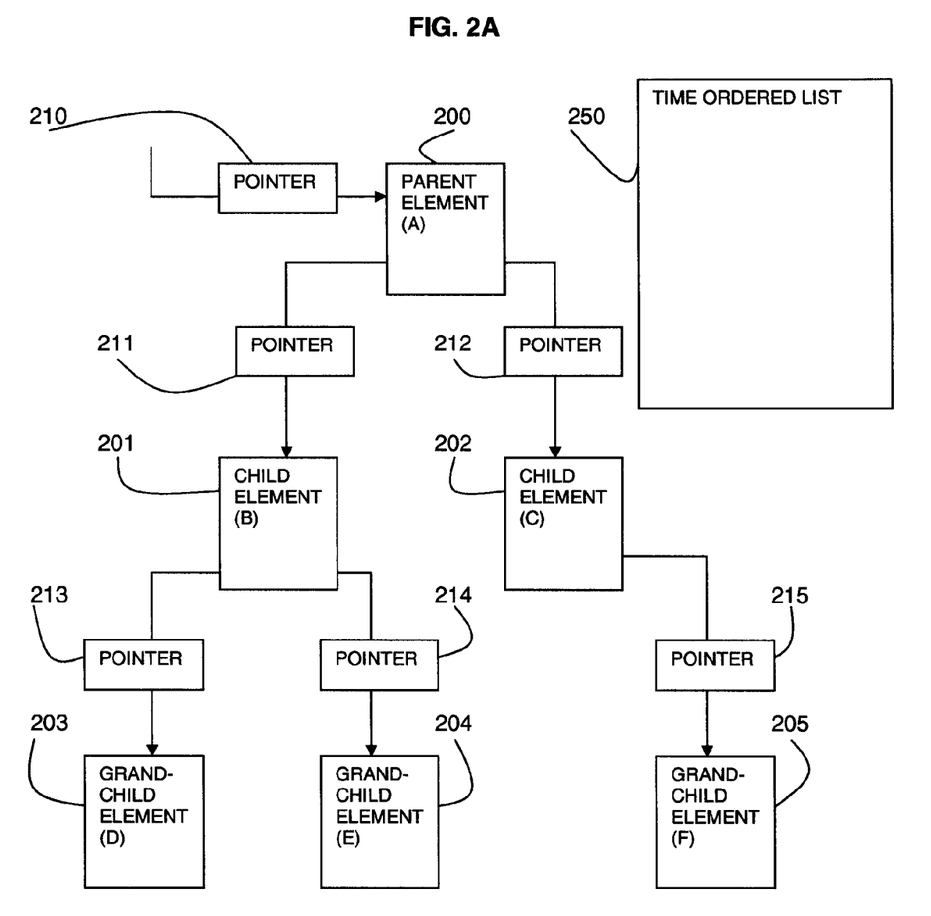
FIGS. 2A and 2B are schematic diagrams of a first example embodiment of a data structure before processing and after processing in accordance with the present invention.
Figure 2B:
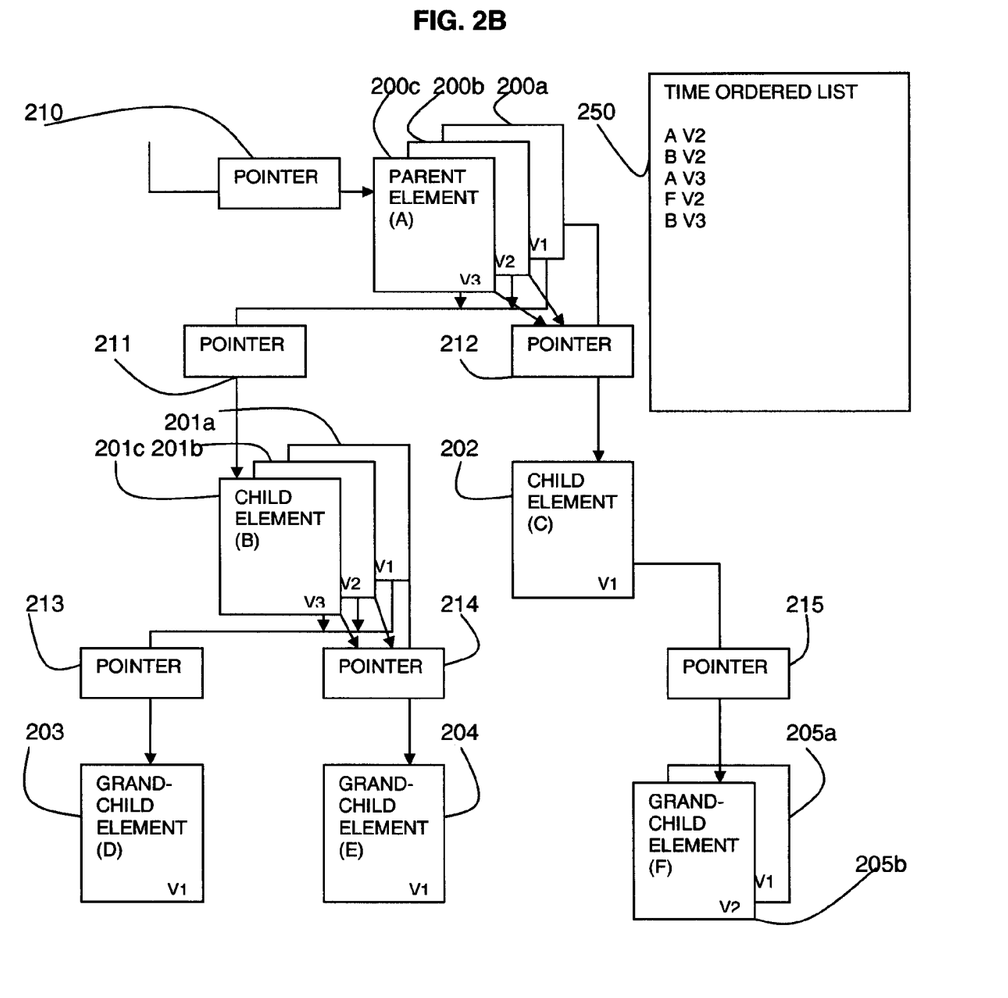

Referring to FIGS. 2A and 2B, a first example of a data structure in accordance with the present invention is now illustrated in the form of a tree data structure. The smallest unit of a tree data structure is a node with none, one or more children. To avoid confusion with the term "node" used for processing nodes, the term "element" is used instead of "node" when referring to nodes of a tree data structure. A general tree data structure is composed of elements pointing to other elements which in turn can point to other elements.

FIG. 2A shows a tree data structure before processing by one or more processing nodes. The tree data structure has pointers or indirections to each element. The illustrated tree data structure has a parent element (A) 200 with a pointer 210. The parent element (A) 200 has two child elements (B) 201, (C) 202 each with pointers 211, 212 from the parent element (A) 200 to the child element (B) 201, (C) 202. One of the child elements (B) 201 has two child elements of its own, grandchild elements (D) 203, (E) 204, with pointers 213, 214 from the child element (B) 201 to its child elements (D) 203, (E) 204. The other child element (C) 202 of the parent element (A) 200 has a child element of its own, a grandchild element (F) 205 with a pointer 215 from the child element (C) 202 to the grandchild element (F) 205.

FIG. 2A shows a time ordered list 250 associated with the data structure. As the data structure has not yet been processed, there are no entries in the time ordered list 250.

FIG. 2B shows the data structure of FIG. 2A after processing by one or more processing nodes. As the processing nodes each make changes to the elements 200-205 of the tree data structure, the new values of the elements 200-205 are stored in linked records of values for each element. In this example embodiment, the linked records of values are push down stacks for each element.

The parent element (A) 200 is shown to have been changed twice, from an initial value (V1) 200a, to a second value (V2) 200b, to a third value (V3) 200c. The values 200a-200c of the element 200 are recorded in a push down stack with the most recent change at the top of the stack (the bottom of the time ordered list 250). In this way the changes can be undone in the correct order.

The child element (B) 201 has also been changed twice with the initial value (V1) 201a, a second value (V2) 201b, and a third value (V3) 201c. The grandchild element (F) 205 has been changed once, with an initial value (V1) 205a and a second value (V2) 205b.

As the values of the elements 200-205 may be changed at different times and by different processing nodes, the sequence order of the changes is stored in the time ordered list 250. In this example, the first change was to the parent element A to change to V2, the next change was to child element B to change to V2, the next change was to parent element A to change to V3, the next change was to grandchild element F to change to V2, the final change was to child element B, to change to V3. These changes are referenced in the time ordered list.

Each entry in the time ordered list 250 may optionally include an indication of which processing node carried out the change, the time and date of the change, etc. To find out the change made, the two versions of the data structure may need to be compared to see the value changed, or the change could be recorded else where, and located from the time ordered list 250

The time ordered list 250 enables a processing node later on in the process to determine which changes where made by earlier processing nodes which may be used in problem determination.

The time ordered list 250 may alternatively be incorporated into the data structure as a chain of pointers in the order in which the changes to elements were made. A mechanism for locating the most recently changed element is required for this, typically a field in a known control block.

Figure 3A:
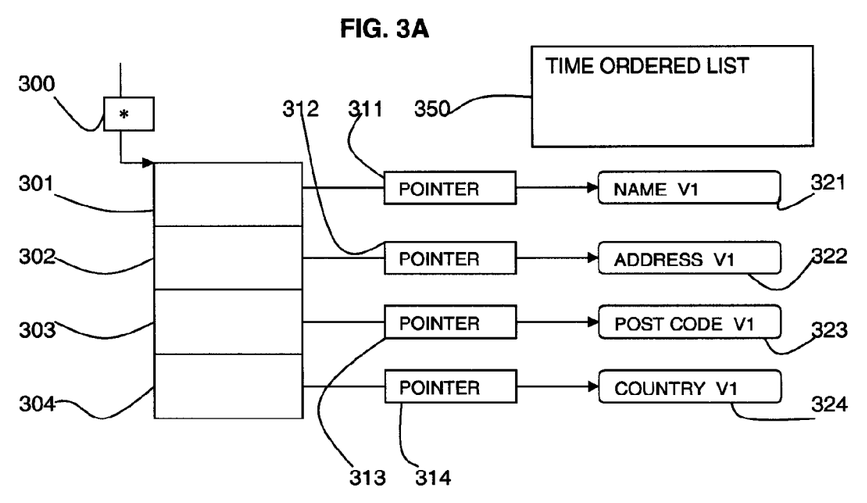
FIGS. 3A and 3B are schematic diagrams of a second example embodiment of a data structure before processing and after processing in accordance with the present invention.
Figure 3B:
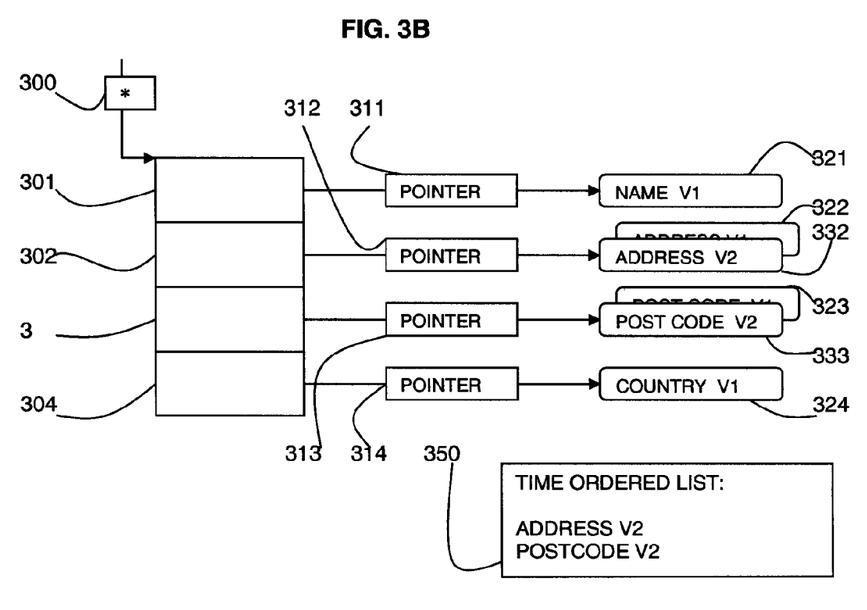

Referring to FIGS. 3A and 3B, a second example of a data structure in accordance with the present invention is now illustrated in the form of an array data structure. Again, the smallest unit of the data structure is referred to as an element.

FIG. 3A shows an array 300 before processing by one or more processing nodes. The array 300 includes elements 301-304 each with a pointer 311-314 to a value 321-324. FIG. 3A shows each element 301-304 with an initial value (V1) 321-324. A time ordered list 350 is also maintained recording the order of the changes made to the array 300. As no processing has yet been carried out in FIG. 3A, the time ordered list 350 is empty.

FIG. 3B shows an array 300 after processing by one or more processing nodes. The values 321-324 of the elements 301-304 are changed and the new value recorded with a link to the previous value, for example as a push down stack of values. The pointers 311-314 point to the updated value which in turn points to or references the previous value. In FIG. 3B, the address value has been updated to a second value (V2) 332 which has replaced the first value 322. The postcode value has also been updated to a second value (V2) 333 which has replaced the first value 323.

The time ordered list 350 of FIG. 3B shows the order of the changes made to the values of the elements 301-304. In this example, the address was changed to V2 followed by the postcode changed to V2.

In the described example embodiments, for each element in the data structure a push down stack is created. Other forms of linked record can also be used.

For example, a pointer in the data structure could contain an array of changes. Using the example of the pointer 211 of FIG. 2B to the child element (B), an array would be as follows:

Current element=3
1.→V1
2.→V2
3.→V3
4.
5.

Where, the current element is the current location in the array; 1 . . . 5. are the elements of the array; 4. and 5. are currently not used; and 1. 2. 3. are the locators of the copies of the data.

To add a new change, copy V3 to a V4, add 1 to current element variable, and store the pointer of V4 in the array (current element) which would be array (4).

In a push down stack, when a processing node changes an element in the data structure, it pushes down the previous element and replaces it with its own element. The changes made are noted in the order they were performed. When the processing node has finished processing, the list of changes is read in reverse time order and the changes to the tree data structure are popped off the stack and the original data structure which was passed ends unchanged. This processing eliminating the data structure copy will be faster than conventional methods. There is also only one copy of the data structure, which will save memory.

The concept of a push down stack is well known in many applications and environments. A stack is a temporary abstract data type and data structure based on the principle of Last In First Out (LIFO). Stacks are used extensively at every level of a modern computer system.

As an abstract data type, the stack is a container (data structure) of elements and has two basic operations: push and pop. Push adds a given element to the top of the stack leaving previous elements below. Pop removes and returns the current top element of the stack. Only the top element is visible and accessible to the user, all other elements remain hidden. As new elements are added, each new element becomes the top of the stack, hiding each element below. As the top element is removed from the stack, the element below can be used as it becomes the top of the stack.

As a familiar concept, when changing a document in an editor the changes are saved in a stack. When an undo (control z) command is issued, the changes are unstacked and the change undone. If the undo command is used repeatedly, the user eventually gets back to the original document.

The processing nodes make changes to the data structure and the different types of changes are now described showing how the described data structures are modified during the processing. Processing a data structure may include the basic operations of modifying a value of an element, adding a new element, or deleting an element.

Figure 4A:
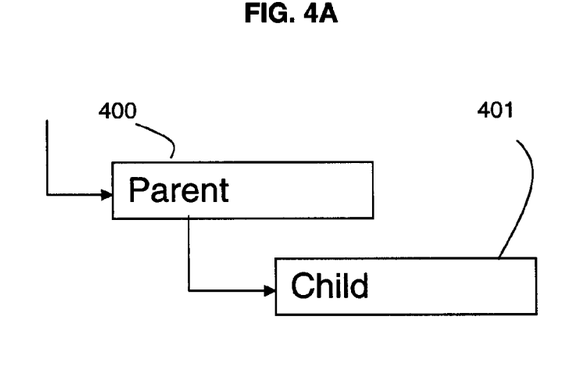
FIGS. 4A and 4B are schematic representations of a tree data structure as known in the prior art.
Figure 4B:
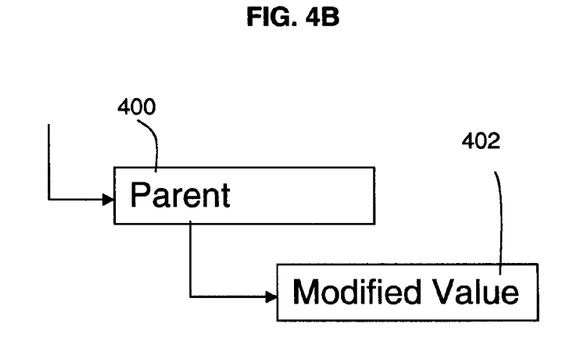

Referring first to the example embodiment of a data structure in the form of a tree data structure, the simplest representation of a known tree data structure is shown in FIG. 4A with a parent element 400 pointing to a child element 401. The output from a processing node as known in the art can be represented as shown in FIG. 4B with the parent element 400 pointing to a modified value as the child element 402.

In the description given below, the same logic applies to the simplest tree data structure as to a more complex tree data structure. The following description details the processing inside one element; however, the same processing applies to the other elements, and the complexity of a real life situation can be extended from considering one element.

Figure 5A:
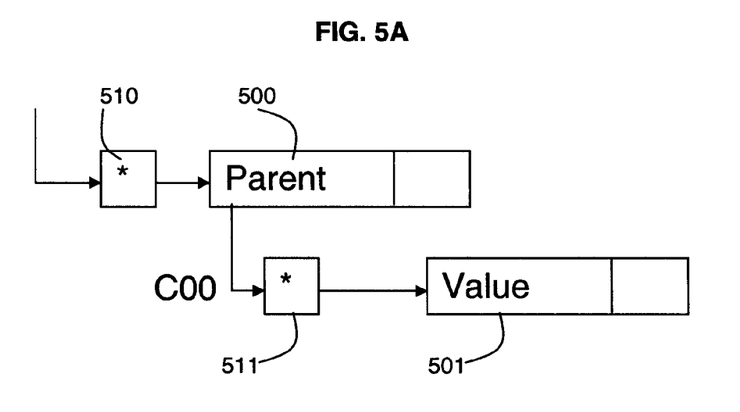
FIGS. 5A to 5C are progressive schematic diagrams of the first example data structure as it is changed in accordance with the present invention.

Instead of having a tree data structure as shown in FIG. 4A, the data is stored in a modified tree data structure as shown in FIG. 5A. The modified tree data structure has a field (also referred to as a pointer or indirection) 510 (shown by an *) with the address of the parent element 500 and a field 511 with the address or identifier (C00) of the child element value 501.

Figure 5B:
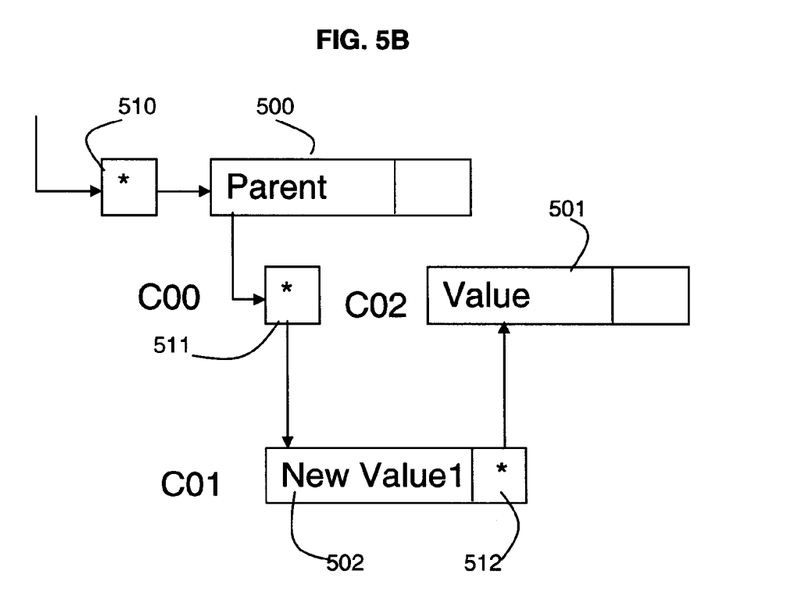

To change a value in the tree data structure, the following is carried out, as illustrated in FIG. 5B.
A new element 502 is allocated with an identifier C01.
This new element (C01) 502 contains a pointer 512 to the element (C02) 501 it is going to replace, C01→C02.
The pointer (C00) 511 to the original element (C02) 501 is changed to point to the new element (C01) 502, C00→C01
The pointer (C00) 511 to the original element (C02) 501 is added to the time ordered list.
The time ordered list includes:
1. C00
To undo the change, the following process is followed:
Examine the time ordered list;
Take the last entry in the list, C00;
Locate the element pointed to by C00. This is C01.
Locate what C01 points to. This is C02;
Change C00 to point to C02; and
Delete element C01.

Figure 5C:
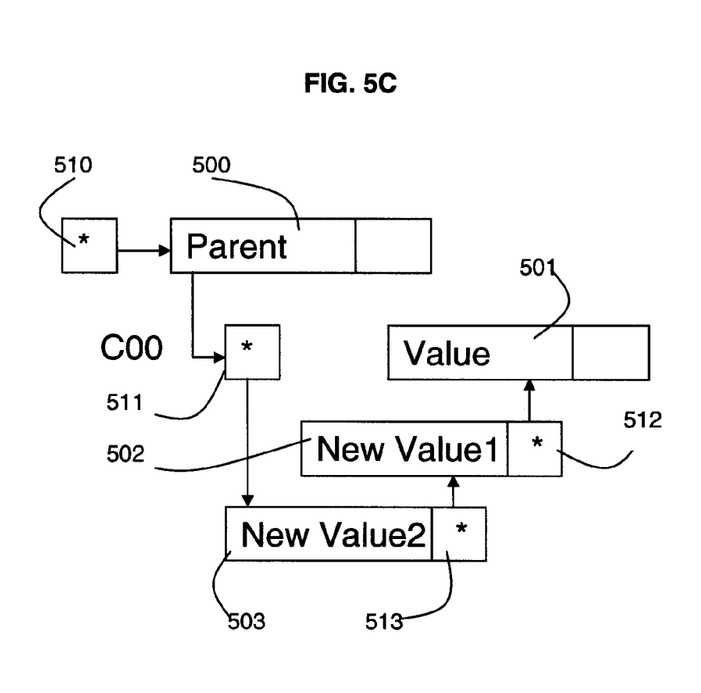

Making a second change within this element would result in a structure shown in FIG. 5C. A new element 503 is allocated which contains a pointer 513 to the previous element 502 which in turn includes a pointer 512 to the original value 501.

The pointer (C00) 511 to the original element 501 is changed to point to the new element 503. The pointer (C00) 511 to the original element 501 is added to the time ordered list.

The time ordered list now includes:
1. C00
2. C00

This time ordered list can have other information such as the identity of the program making the change, the date and time values.

The new values 503, 502 of the element 501 are shown as linked by arrows. These values may be provided in a push down stack with the newest value on the top of the stack.

FIG. 5C shows a single child element of the parent, this Figure can be extended to include additional child elements and grandchild elements, and so on. The time ordered list keeps track of the sequence of changes across the entire data structure.

Figure 6A:
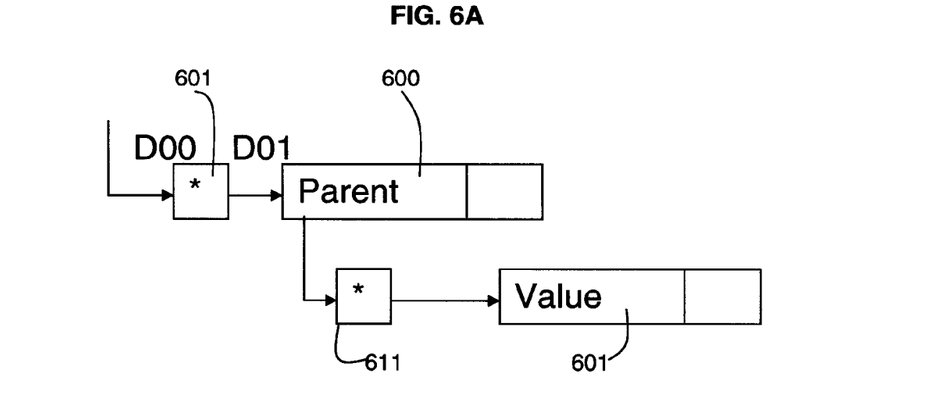
FIGS. 6A and 6B are progressive schematic diagrams of the first example data structure as it has an element added.
Figure 6B:
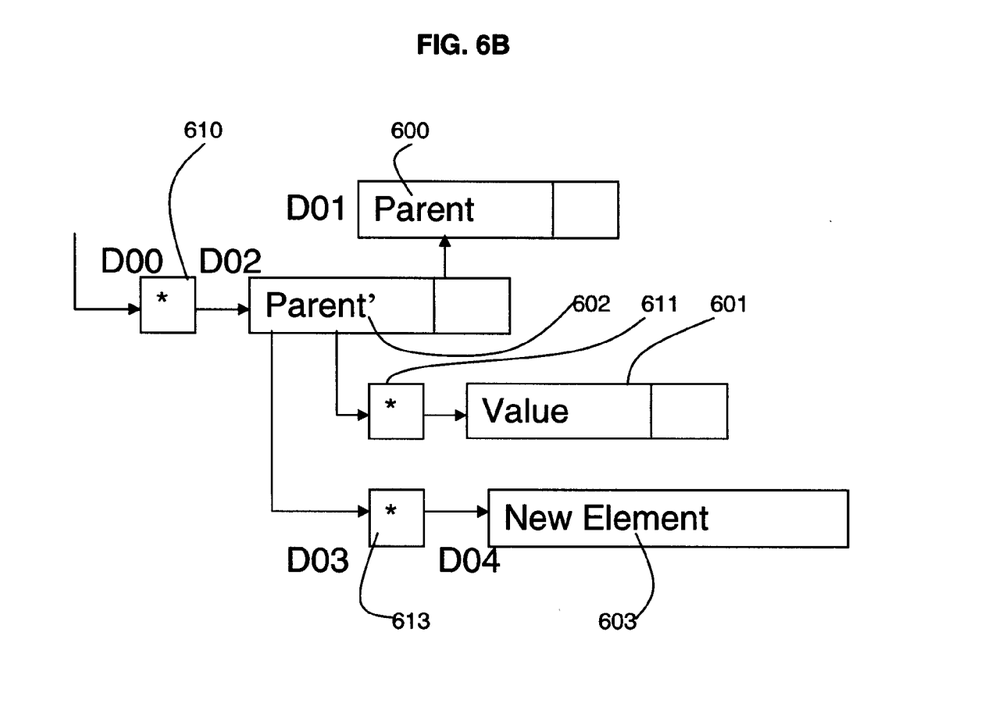

To add a new value to the tree data structure, the following is carried out as illustrated in FIGS. 6A and 6B. FIG. 6A shows a tree data structure with a field 601 with the address (D00) of the parent element (D01) 600 and a field 611 with the address of the child element value 601.

The parent 600 needs to change to add a new child element.

The steps are:
A copy (D02) 602 of the parent is made;
The copy (D02) 602 of the parent points to the original parent (D01) 600, D02 D01;
The original pointer (D00) 610 to the parent 600 points to the new copy (D02) 602 of the parent, D00 D02.
The original pointer (D00) 610 is added to the time ordered list.
A new child element (D04) 603 is created;
A new pointer (D03) 613 is created and its value is set to the address of the new child element (D04) 603;
The new pointer (D03) 613 is added to the copy (D02) 602 of the parent;
The new child element pointer (D03) 603 is added to the time ordered list.
The time ordered list includes:
1. The parent element pointer D00;
2. The new child element pointer D03.
To undo the change, the following is carried out:
Take the last element off the time ordered list, D03;
Delete the element that D03 points to. Which is D04;
Delete D03;
Take the previous element off the time ordered list, D00;
Locate what D00 points to. This is D02;
Locate what D02 points to. This is D01;
Change D00 to point to D01;
Delete element D02.

Figure 7A:
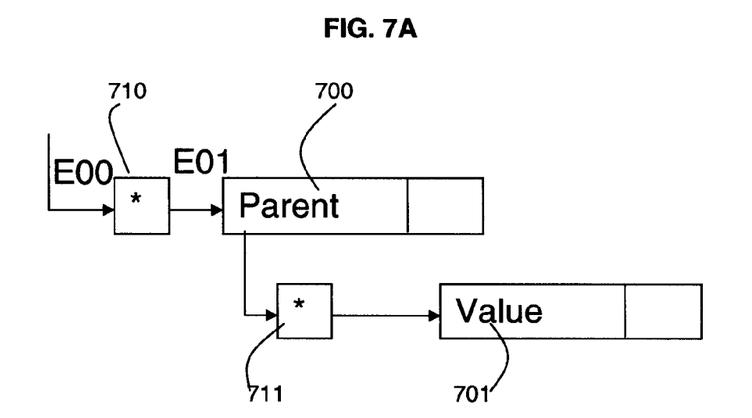
FIGS. 7A and 7B are progressive schematic diagrams of the first example data structure as it has an element deleted.
Figure 7B:
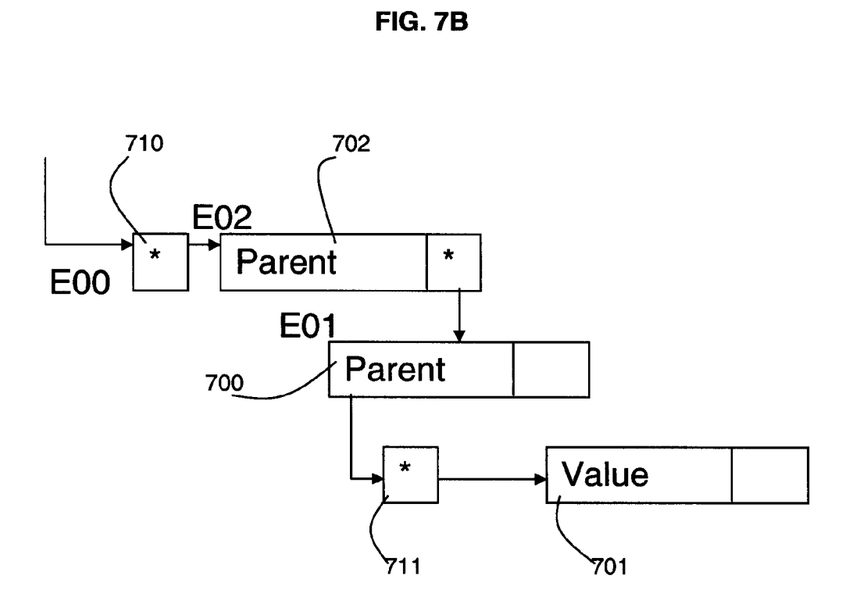

To delete a value to the tree data structure, the following is carried out as illustrated in FIGS. 7A and 7B. FIG. 7A shows a tree data structure with a field 710 with the address (E00) of the parent element (E01) 700 and a field 711 with the address of the child element value 701.

The parent needs to change to remove a child element.
The steps are:
A copy (E02) 702 of the parent is made;
The copy (E02) 702 of the parent points to the original parent (E01) 700, E02→E01;

The original pointer (E00) 710 to the parent points to the new copy (E02) 702 of the parent, E00→E02;

The child element 711 is removed from the copy (E02) 702 of the parent.

The time ordered list identifies
1. The parent element E00.

To undo the change, the following is carried out:
Take the last element off the time ordered list, E00;
Locate what E00 points to. This is E02;
Locate what E02 points to. This is E01;
Change E00 to point to E01;
Delete element E02.

Figure 8A:
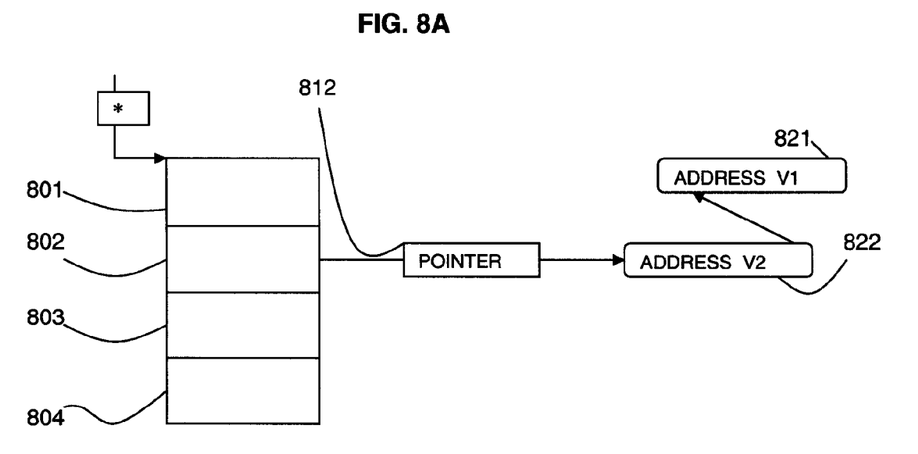
FIGS. 8A and 8B are schematic diagrams of the second example data structure when it has an element changed and deleted respectively.
Figure 8B:
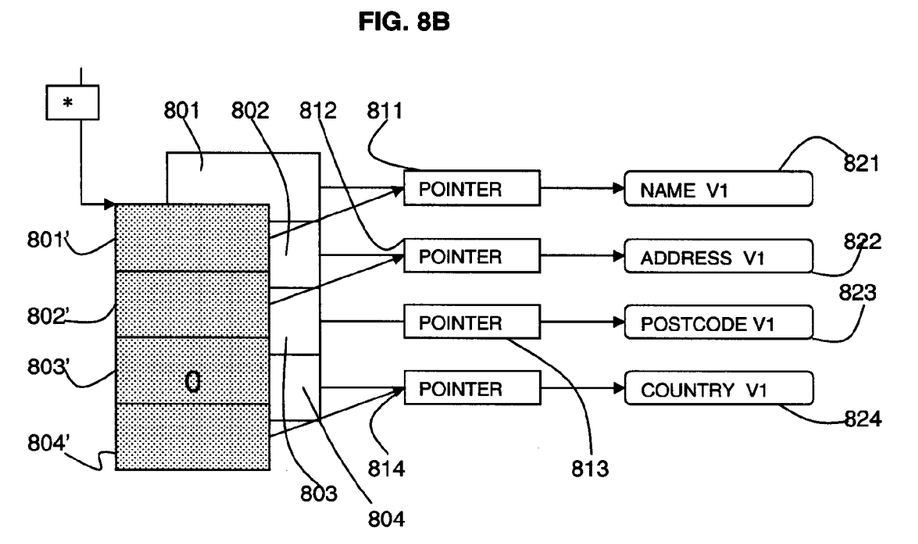

In the second example embodiment of a data structure in the form of an array as shown in FIGS. 3A and 3B, the basic operations of changing the value of an element and deleting an element are shown in FIGS. 8A and 8B.

In FIG. 8A, an array has elements 801-804. The address value is changed for the array element 802 and the pointer 812 points to the new value of the address 822 which in turn points to the previous value of the address 821. In FIG. 8B, an array is shown with elements 801-804 with pointers 811-814 to the element values 821-824. An element 803 is deleted from the array. When inserting or removing a value in the array, a copy of the array is made 801'-804'. This points to the previous array 801-804. The element is added or deleted from the new copy of the array 801'-804'. When an element is deleted the field 803' is set to a null value.

When a new element is inserted into an array, a copy of the array must be made including the new element and pointing to the previous copy of the array for the other element values.

For example, when a new element is inserted into an array or removed from the array, a new copy of the array is created and the required element copied from the original array. An address of the original array is preferably stored (e.g. within a time ordered list or in an element in the new array).

Stacks are known for use in, for example, Microsoft Word (Microsoft Word is a trade mark of Microsoft Corporation), where the changes being recorded were made by a single process. This does not help with memory or processing cost. The described method addresses the case in which multiple processing nodes can be making changes at various stages of processing and would otherwise make lots of copies. The push down stack associated with a node represents the changes made by that node and can reference the original message structure to avoid making lots of subtly different copies.

Figure 9:
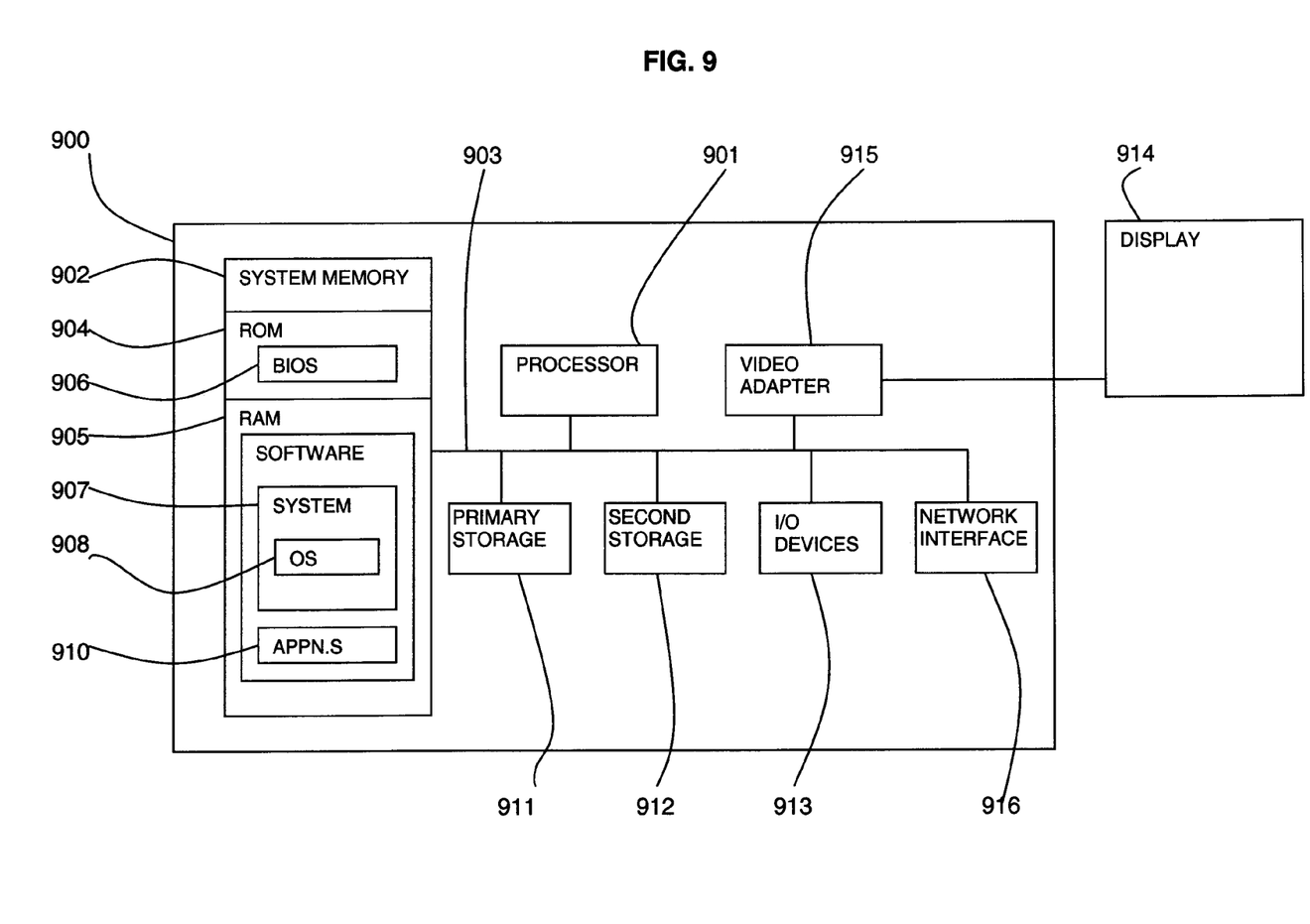
FIG. 9 is a block diagram of a data processing system in which the present invention may be implemented.

Referring to FIG. 9, an exemplary system for implementing the described method, for example in a message broker, application server, etc., includes a data processing system 900 suitable for storing and/or executing program code including at least one processor 901 coupled directly or indirectly to memory elements through a bus system 903. The memory elements can include local memory employed during actual execution of the program code, bulk storage, and cache memories which provide temporary storage of at least some program code in order to reduce the number of times code must be retrieved from bulk storage during execution.

The memory elements may include system memory 902 in the form of read only memory (ROM) 904 and random access memory (RAM) 905. A basic input/output system (BIOS) 906 may be stored in ROM 904. System software 907 may be stored in RAM 905 including operating system software 908. Software applications 910 may also be stored in RAM 905.

The system 900 may also include a primary storage means 911 such as a magnetic hard disk drive and secondary storage means 912 such as a magnetic disc drive and an optical disc drive. The drives and their associated computer-readable media provide non-volatile storage of computer-executable instructions, data structures, program modules and other data for the system 900. Software applications may be stored on the primary and secondary storage means 911, 912 as well as the system memory 902.

The computing system 900 may operate in a networked environment using logical connections to one or more remote computers via a network adapter 916.

Input/output devices 913 can be coupled to the system either directly or through intervening I/O controllers. A user may enter commands and information into the system 900 through input devices such as a keyboard, pointing device, or other input devices (for example, microphone, joy stick, game pad, satellite dish, scanner, or the like). Output devices may include speakers, printers, etc. A display device 914 is also connected to system bus 903 via an interface, such as video adapter 915.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-implemented method for capturing and applying changes to a data structure, the method comprising:
   establishing an initial node architecture for processing a first version of a data structure, with the node architecture including:
   a plurality of compute nodes;
   a plurality of processing nodes respectively processing or transforming elements in a data structure passed thereto and including a data storage resource structured, programmed and connected in data communication to store data, the processing nodes including:
   a set of input nodes each receiving the data structure initially in the initial node architecture and passing the data structure to one of the compute nodes,
   a plurality of compute nodes, each processing the data structure differently and outputting amended versions of the data structure, and a set of output nodes each receiving the data structure post-processing from one of the compute nodes as output from the initial node architecture;

implementing, in the plurality of data storage resources of the plurality of processing nodes, a message broker that is structured, programmed and connected in data communication to translate messages from a formal messaging protocol of a sender to a formal messaging protocol of the receiver;

passing, by the set of input nodes to the plurality of compute nodes, the first version of the data structure;

responsive of the passing of the data structure to the plurality of compute nodes, modifying, by the compute nodes, a plurality of elements of the first version of the data structure to generate a second version of the data structure; and passing, by the plurality of compute nodes to the set of output nodes, the second version of the data structure;

wherein the passing of the first version of the data structure, the passing of the second version of the data structure and the modification of the first version of the data structure uses message-based communication managed and controlled by the message broker.

2. The computer-implemented method of claim 1 further comprising:

maintaining, by each of the compute nodes, a linked record of any modifications, made by the plurality of compute nodes, to the data structure.

3. The computer-implemented method of claim 2 wherein the linked record includes a link corresponding to each modification of each element of the data structure, with each link linking modified version of an element to a previous version of the element as it existed before the modification.

4. The computer-implemented method of claim 3 further comprising:

maintaining a record of the sequence of modifications made to the elements by the plurality of compute nodes.

5. The computer implemented method of claim 2 further comprising:

undoing, using the linked record, a first modification to an element of the data structure to generate a third version of the data structure.

6. The computer implemented method of claim 1 further comprising:

undoing, using the linked record, the modifications made, by the compute nodes, to the first version the data structure to recover the first version of the data structure from the second version of the data structure.

7. A computer program product for capturing and applying changes to a data structure, the computer program product comprising a non-transitory computer readable storage medium having computer readable program code embodied therewith, the computer readable program code comprising computer readable program code for:

establishing an initial node architecture for processing a first version of a data structure, with the node architecture including:

a plurality of compute nodes;

a plurality of processing nodes respectively processing or transforming elements in a data structure passed thereto and including a data storage resource structured, programmed and connected in data communication to store data, the processing nodes including:

a set of input nodes each receiving the data structure initially in the initial node architecture and passing the data structure to one of the compute nodes, a plurality of compute nodes, each processing the data structure differently and outputting amended versions of the data structure, and a set of output nodes each receiving the data structure post-processing from one of the compute nodes as output from the initial node architecture;

implementing, in the plurality of data storage resources of the plurality of processing nodes, a message broker that is structured, programmed and connected in data communication to translate messages from a formal messaging protocol of a sender to a formal messaging protocol of the receiver;

passing, by the set of input nodes to the plurality of compute nodes, the first version of the data structure;

responsive of the passing of the data structure to the plurality of compute nodes, modifying, by the compute nodes, a plurality of elements of the first version of the data structure to generate a second version of the data structure; and passing, by the plurality of compute nodes to the set of output nodes, the second version of the data structure;

wherein the passing of the first version of the data structure, the passing of the second version of the data structure and the modification of the first version of the data structure uses message-based communication managed and controlled by the message broker.

8. The computer program product of claim 7 further comprising:

maintaining, by each of the compute nodes, a linked record of any modifications, made by the plurality of compute nodes, to the data structure.

9. The computer program product of claim 8 wherein the linked record includes a link corresponding to each modification of each element of the data structure, with each link linking modified version of an element to a previous version of the element as it existed before the modification.

10. The computer program product of claim 9 further comprising:

maintaining a record of the sequence of modifications made to the elements by the plurality of compute nodes.

11. The computer program product of claim 8 further comprising:

undoing, using the linked record, a first modification to an element of the data structure to generate a third version of the data structure.

12. The computer program product of claim 7 further comprising:

undoing, using the linked record, the modifications made, by the compute nodes, to the first version the data structure to recover the first version of the data structure from the second version of the data structure.

13. A system for capturing and applying changes to a data structure, the system comprising:

a host computing system comprising at least one computer comprising at least one processor and memory;

computer program code executing in the host computing system, the program code:

establishing an initial node architecture for processing a first version of a data structure, with the node architecture including:

a plurality of compute nodes;

a plurality of processing nodes respectively processing or transforming elements in a data structure passed thereto and including a data storage resource structured, programmed and connected in data communication to store data, the processing nodes including:

a set of input nodes each receiving the data structure initially in the initial node architecture and passing the data structure to one of the compute nodes,
a plurality of compute nodes, each processing the data structure differently and outputting amended versions of the data structure, and
a set of output nodes each receiving the data structure post-processing from one of the compute nodes as output from the initial node architecture;
implementing, in the plurality of data storage resources of the plurality of processing nodes, a message broker that is structured, programmed and connected in data communication to translate messages from a formal messaging protocol of a sender to a formal messaging protocol of the receiver;
passing, by the set of input nodes to the plurality of compute nodes, the first version of the data structure; and,
responding to the passing of the data structure to the plurality of compute nodes, by modifying, by the compute nodes, a plurality of elements of the first version of the data structure to generate a second version of the data structure and passing, by the plurality of compute nodes to the set of output nodes, the second version of the data structure;
wherein the passing of the first version of the data structure, the passing of the second version of the data structure and the modification of the first version of the data structure uses message-based communication managed and controlled by the message broker.

14. The system of claim 13 further comprising:
maintaining, by each of the compute nodes, a linked record of any modifications, made by the plurality of compute nodes, to the data structure.

15. The system of claim 14 wherein the linked record includes a link corresponding to each modification of each element of the data structure, with each link linking modified version of an element to a previous version of the element as it existed before the modification.

16. The system of claim 15 further comprising:
maintaining a record of the sequence of modifications made to the elements by the plurality of compute nodes.

17. The system of claim 14 further comprising:
undoing, using the linked record, a first modification to an element of the data structure to generate a third version of the data structure.

18. The system of claim 13 further comprising:
undoing, using the linked record, the modifications made, by the compute nodes, to the first version the data structure to recover the first version of the data structure from the second version of the data structure.

\* \* \* \* \*